Feb. 18, 1969 P. R. NUTE ET AL 3,427,867
ULTRASONIC ATTENUATION METER
Filed Nov. 22, 1965

Philip R. Nute,
Steven Serabian,
Frederick G. Weighart,
INVENTORS.

BY

ATTORNEY.

United States Patent Office 3,427,867
Patented Feb. 18, 1969

3,427,867
ULTRASONIC ATTENUATION METER
Philip R. Nute, Sandy Hook, Conn., Steven Serabian, Chelmsford, Mass., and Frederick Weighart, Brookfield, Conn., assignors to Automation Industries, Inc., El Segundo, Calif., a corporation of California
Filed Nov. 22, 1965, Ser. No. 531,007
U.S. Cl. 73—67.9   11 Claims
Int. Cl. G01n 9/24

ABSTRACT OF THE DISCLOSURE

A transducer launches a pulse of ultrasonic energy into a workpiece, the energy repeatedly reflecting between front and rear surfaces of the workpiece. Amplitude of the echoes decreases as a function of attenuation. Sampling circuits select two predetermined echo signals. The predetermined echo signals are compared to provide an output signal which is a function of the ratio between the amplitudes of the two predetermined signals.

---

Figure 1:
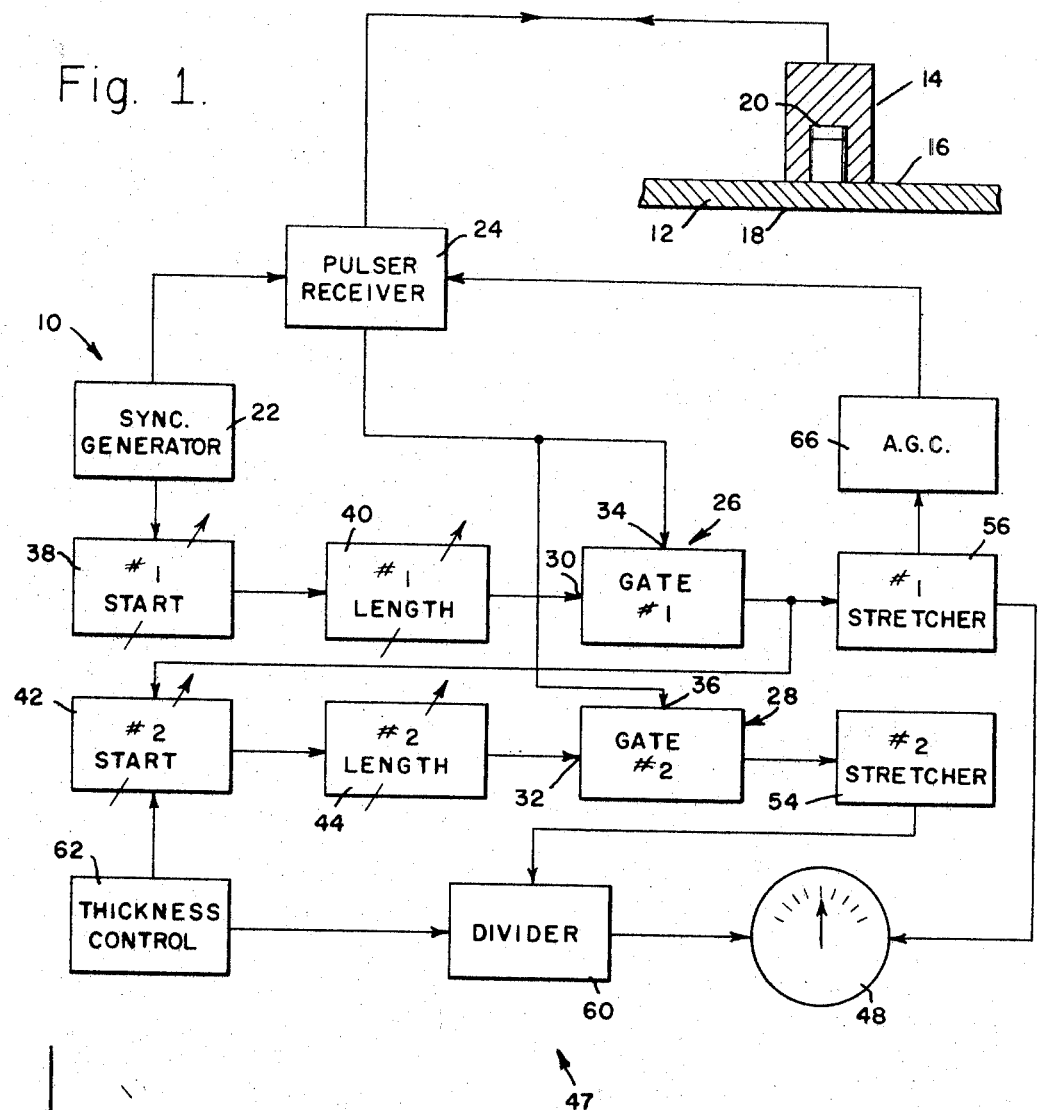

The present invention relates to ultrasonic nondestructive testing means and more particularly, to means for measuring the amount of ultrasonic attenuation in a material.

In one form of nondestructive testing ultrasonic energy is transmitted into the workpiece and the manner in which the energy reacts with the workpiece is measured. Usually the way in which the energy is reflected or blocked is measured, for example, the time of the echo, the lack of through transmission etc. This provides information as to voids, inclusions, thickness, etc. More recently it has been found that various characteristics such as porosity, grain structure, etc. can be determined by measuring the rate at which the ultrasonic energy is absorbed as it propagates through the material.

In order to measure the attenuation it has been customary to transmit a pulse of ultrasonic energy into the workpiece whereby it is repeatedly reflected between the front and rear surfaces of the workpiece so as to produce a sequence of echoes wherein the amplitude of each echo is decreased from that of the preceding echo by an amount corresponding to the attenuation.

Heretofore, in order to measure this attenuation a sequence of "pips" corresponding to the echoes have been displayed upon an oscilloscope. The amplitudes of these "pips" progressively decrease similar to the echoes. The envelope for the "pips" decays exponentially as a function of the attenuation. An operator has endeavored to manually match an exponential curve with this envelope and then endeavor to compute the amount of attenuation. As can be seen, this is not only a slow and time consuming process but is also subject to operator error. Moreover, the measurement is of an intermittent nature and cannot be employed to continuously measure ultrasonic attenuation as would be necessary when monitoring a continuous process. It will thus be seen that the foregoing attenuation measuring means have not been entirely satisfactory.

The present invention provides means for overcoming the foregoing difficulties. More particularly attenuation measuring means are provided for measuring the amount of ultrasonic attenuation of a material without any manual manipulation or calculations being required. In the present instance this is accomplished by attenuation measuring means capable of automatically and continuously measuring the amount of ultrasonic attenuation of the material within a workpiece.

In the single embodiment of the present invention disclosed herein a pulse of ultrasonic energy is transmitted into the workpiece so as to be repeatedly reflected between various interfaces such as the front and rear faces of the workpiece. The resultant echoes are received at one of the faces so as to produce a sequence of echo signals having amplitudes that decrease as a function of the ultrasonic attenuation. Suitable sampling means sample preselected ones of the echo signals to provide a pair of continuous sample signals. Comparator means then compare these sample signals to provide a continuous attenuation signal that is a function of the ratio between the sample signals.

Figure 2:
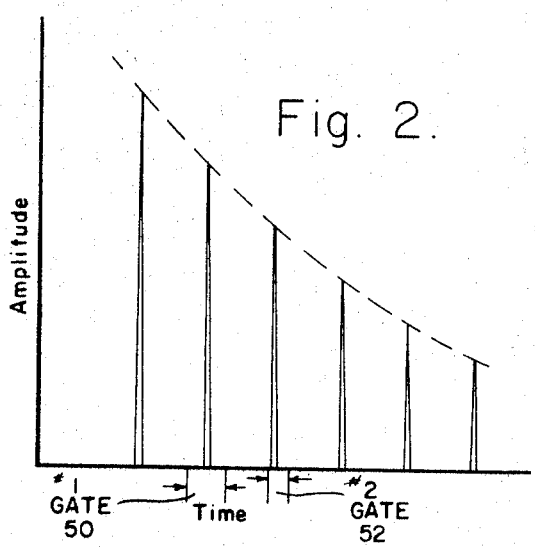

These and other features and advantages of the present invention will become readily apparent from the following detailed description of one operative embodiment thereof, particularly when taken in connection with the accompanying drawings wherein like reference numerals refer to like parts and wherein;

FIGURE 1 is a block diagram of an attenuation measuring system embodying one form of the present invention, and FIGURE 2 is a series of wave forms present in one portion of the system of FIGURE 1.

Referring to the drawings in more detail the present invention is particularly adapted to be embodied in an attenuation measuring system 10. This system 10 is especially useful for measuring the amount or rate at which ultrasonic energy is attenuated as it is propagated through a workpiece 12.

In the present instance this system 10 includes a search unit 14 having a face which is adapted to be placed in intimate contact with one of the surfaces 16 of the workpiece 12. Normally, this surface 16 is relatively flat and separated from a second relatively flat surface 18 that is substantially parallel thereto. An ultrasonic transducer 20 is positioned inside of the search unit 14 for transmitting ultrasonic energy in response to electrical signals.

Normally a short electrical pulse is applied to the transducer 20 whereby it will transmit a very short pulse or burst of ultrasonic energy. This energy will pass through the front face 16 and into the material in the workpiece 12. This energy will then be repeatedly reflected between the front and rear faces 16 and 18 whereby a series of echoes will occur at the front face 16 adjacent to the search unit 14. Each time one of these echoes occurs its amplitude will be decreased from the amplitude of the preceding echo by an amount corresponding to the attenuation encountered as the energy travels from the front face to the rear face and returns to the front face. A portion of the energy in each of these echoes will be coupled into the search unit 14. The transducer 20 responds to the ultrasonic echoes and produces a sequence of electrical echo signals. The amplitudes of these signals will, of course, decrease in the same manner as the ultrasonic echoes.

A suitable combination pulser-receiver 24 is coupled to the transducer 20 in the search unit 14 and to a synchronizing pulse generator 22. The pulse generator 22 may be of a free running variety capable of producing a series of trigger pulses. These pulses determine the repetition rate at which the system 10 operates and also synchronizes the operation of various portions of the system 10.

Each time the pulse generator 22 supplies a pulse to the pulser 24, the pulser 24 applies an electrical pulse to the transducer 20 whereby a pulse of ultrasonic energy is transmitted into the workpiece 12 and repeatedly reflected between the front and rear surfaces 16 and 18. These reflections will continue for an extended period of time, or until the energy is completely attenuated as it propagates through the workpiece. Each time an echo occurs at the front surface of the workpiece 12, the transducer 20 produces a corresponding electrical echo signal that is coupled into the receiver 24 and amplified. These signals are normally similar to those shown in FIGURE 2.

More particularly, each of the signals is separated from the preceding signal by an interval equal to the flight time required for the energy to travel from the front surface 16 to the rear surface 18 and return. In addition the amplitude of each of the signals is decreased from the amplitude of the preceding signal by an amount corresponding to the amount of attenuation occurring during the round trip through the workpiece 12. As a consequence the peaks of these signals will have an envelope that decays exponentially.

Heretofore, in order to measure the amount of attenuation it has been necessary to display these signals on the face of a cathode ray tube and then manually fit a curve to the general shape to the peaks whereby the curve forms an envelope. By analyzing the fitted curve, it is possible to compute the attenuation of the material.

In the present instance the attenuation is automatically determined. This is accomplished by providing suitable sampling means such as gates 26 and 28. Each of these gates 26 and 28 includes a control input 30 and 32 and a signal input 34 and 36. The signal inputs 34 and 36 are coupled to the receiver 24 whereby all of the echo signals of FIGURE 2 are applied to both gates 26 and 28. When there is no signal present on the control input 30 or 32, the gate 26 or 28 is closed and the echo signals on the signal input 34 and 36 cannot pass therethrough. However, when a signal is applied to a control input 30 or 32 the corresponding gate 26 or 28 respectively, opens and the signal on the input 30 or 32 passes through the gate to the output.

The control inputs 30 and 32 for the two gates 26 and 28 are coupled to the sync generator 22 whereby the gates 26 and 28 will be opened and closed in synchronism with the rest of the system 10. More particularly the control input 30 for the first gate 26 is coupled to the sync generator 22 by suitable time delay means such as a start circuit 38 and a length circuit 40.

The start circuit 38 may be a conventional time delay circuit such as a monostable or one-shot multivibrator. Each time the sync generator 22 applies a trigger pulse to the pulser-receiver 24 whereby the transducer 20 is energized, a corresponding pulse will be applied to the start circuit 38. The start circuit 38 will then change its state for a preselected time and then return to its stable state. The ouput signal will thereby be a square wave pulse of fixed duration. The #1 length circuit 40 is coupled to the start circuit 38 so as to be responsive to the trailing edge of the square wave pulse. The length circuit 40 may also be a monostable or one-shot multivibrator that produces a square wave of fixed duration. This square wave is delayed from the sync pulse by the duration of the wave from start circuit 38 and persists for some predetermined time interval.

The length circuit 40 is coupled to the control input 30 of the #1 gate 26 so as to apply the delay pulse thereto. As a consequence, during this delayed period the gate 26 opens and passes any signals which are on the signal input 34. During all other periods the gate 26 remains closed and blocks the passage of all signals.

The #2 gate 28 is also coupled to the sync generator 22 by suitable delay means. Although this may be a direct connection, in the present instance it is indirectly connected through the output of the #1 gate 26. This will be effective to insure #2 gate 28 opening only after #1 gate 26 has opened. The #2 gate 28 may be controlled by any suitable time delay means, however, in the present instance the delay means is very similar to that for the #1 gate 26. More particularly, a second start circuit 42 and a second length circuit 44 are coupled to the output of the #1 gate 26. These are substantially identical to the #1 start and #1 length circuits 38 and 40 respectively. The #2 start circuit 42 is effective to produce a square wave that commences coincident with the echo signal passed through #1 gate 26 and ends a predetermined time thereafter. The #2 length circuit 44 will then produce a square wave that is applied to the #2 gate 28 whereby the #2 gate 28 will be opened for a preselected time interval.

It may thus be seen that the #1 and #2 gates 26 and 28 will be effective to sample the signal from the receiver 24 at two separate intervals delayed by different amounts from the initial transmission of the ultrasonic energy. As a consequence the outputs of the gates 26 and 28 will provide two separate sample signals.

The decrease in the amplitude of the second sample signal is a function of the attenuation of the ultrasonic energy resulting from its propagation through the workpiece 12. Accordingly, the ratio between these two sample signals is a function of the attenuation. Suitable signal comparator and indicating means 47 may be provided for sensing this ratio and continuously indicating the attenuation. In the present instance this includes a meter 48 that is calibrated to continuously indicate the attenuation.

In order to use the present system 10 for measuring the attenuation in a workpiece 12 the transducer 20 is acoustically coupled to the front face 16 and the sync generator 22 is energized. The transducer 20 will then intermittently transmit pulses of ultrasonic energy into the workpiece 12 for reflection between the front and rear faces 16 and 18. The transducer 20 and receiver 24 will then produce a series of amplified echo signals that exponentially decay similar to FIGURE 2.

Simultaneously with the transmission of the ultrasonic pulse, the #1 start circuit 38 is energized to produce a time delayed signal which triggers the #1 length circuit 40. The length circuit 40 will then produce a square wave which will open the #1 gate 26 for a predetermined sample or gate interval 50.

The #1 start circuit 38 and #1 length circuit 40 are adjusted so as to insure the #1 gate 26 opening during a first gate interval 50 which will include a particular one of the echo signals. Preferably the echo signal sampled is of a large amplitude, i.e., one of the first ones to occur. Since the echo signal has a very short time duration and will terminate before a succeeding echo signal, a #1 stretcher 56 may be coupled to the gate 26 to increase the duration of the signal. By way of example, the stretcher 56 may include any form of storage means such as a condenser.

When the signal is coupled through the #1 gate 26, the #2 start circuit 42 and #2 length circuit 44 are energized and open the #2 gate 28 during a second gate interval 52. The #2 start and length circuits 42 and 44 are adjusted so that this gate interval 52 will include a second particular echo signal. This signal is preferably an early echo signal having a large amplitude. However, it should be noted that it is not necessarily the next succeeding echo signal. A second signal stretcher 54 may be coupled to the #2 gate 28 to increase the time duration of the second signal so as to overlap the first sample signal from the #1 stretcher 56.

The signal comparator 47 will then compare the amplitude of the two signals and produce an indication as to the ratio of two signals. This ratio will correspond to the amount of attenuation produced in the workpiece.

In the event that it is desirable to indicate the amount of attenuation per unit thickness (i.e., decibels per inch) a divider 60 and thickness control 62 may be provided. The thickness control 62 is set to correspond to the distance between the reflecting surfaces which produce the particular echoes being sampled. It should be noted that this thickness control 62 may be manually set or may be automatically set by sensing the time interval between the pair of sampled signals and thereby sensing the thickness of the workpiece 12. The divider 60 will then divide one of the signals, for example the one from the #2 stretcher 54 whereby a continuous indication of attenuation per unit thickness will be provided. It has been found desirable to couple an automatic gain control 66 to the #1 stretcher 56 and the receiver 24. This control 66 is effective to vary the gain so as to maintain the amplitude of the sampled and stretched signal substantially constant.

While only a single embodiment of the present invention has been disclosed herein it will be readily apparent to persons skilled in the art that numerous modifications and changes may be made thereto without departing from the spirit of the invention. For example, the various echo signals may be sampled by means other than the gates shown and the thickness control may be varied from that disclosed. In addition if the automatic gain control can maintain the amplitude of one signal sufficiently constant, the amplitude of the other signal may be read directly and thereby eliminate the necessity for comparing the amplitude of the two signals. Accordingly, the foregoing disclosure and description thereof are for illustrative purposes only and do not in any way limit the scope of the invention which is defined only by the claims which follow.

We claim:

1. An attenuation comparator for measuring the attenuation of ultrasonic energy in a workpiece having front and rear faces, said comparator including the combination of:

transducer means for propagating a pulse of ultrasonic energy into the workpiece whereby said pulse is repeatedly reflected between the front and rear faces, receiving means coupled to the transducer means to produce a series of echo signals corresponding to the successive echoes of said energy within said workpiece, a first gate coupled to the receiving means and effective to pass a first particular echo signal corresponding to a particular one of said echoes, an automatic gain control coupled to said receiving means and said first gate, said gain control being effective to vary the gain of said receiving means to maintain the passed signal constant, a second gate coupled to the receiving means and effective to pass a second particular echo signal corresponding to a particular one of said echoes, a comparator coupled to said gates and effective to compare the passed signals and produce a ratio signal that is a function of the ratio between the said signals, and a thickness control coupled to the comparator and effective to divide the ratio signal as a function of the difference between the distances traveled by the two echoes.

2. An attenuation comparator including the combination of:

transducer means for propagating a pulse of ultrasonic energy into a workpiece whereby said pulse is reflected between front and rear faces of the workpiece to produce a series of echoes, receiving means coupled to the transducer means to produce a series of echo signals corresponding to the successive echoes, a first gate coupled to the receiving means and effective to pass a first particular echo signal, an automatic gain control coupled to said receiving means and said gate, said gain control being effective to vary the gain of said receiving means to maintain the passed signal constant, a second gate coupled to the receiving means and effective to pass a second particular echo signal, and a comparator coupled to the two gates and effective to compare the passed signals and produce a signal that is a function of the ratio therebetween.

3. An attenuation comparator for measuring the attenuation in a workpiece, said comparator including the combination of:

transducer means for producing a series of echo signals in response to a sequence of ultrasonic echoes resulting from an ultrasonic pulse repeatedly reflected between front and rear faces of the workpiece, a first gate coupled to said transducer means and effective to pass a first particular echo signal, a second gate coupled to said transducer means and effective to pass a second particular echo signal, an automatic gain control coupled to at least one of said gates and effective to maintain one of the passed signals constant, and a comparator coupled to said gates and effective to compare the two passed signals and produce an attenuation signal that is a function of the ratio between said two signals.

4. An attenuation comparator for measuring the attenuation of a pulse of ultrasonic energy propagated between the front and rear faces of a workpiece, said comparator including the combination of:

a transducer for sensing the echoes of ultrasonic energy successively reflected between the front and rear faces, a receiver coupled to the transducer and effective to produce a series of echo signals in response to the successive echoes, each of said echo signals occurring at times corresponding to the distances traveled by the echoes reflected from the front and rear faces of said workpiece, a first gate coupled to the receiver, said first gate being effective to open at a first time corresponding to the distance traveled by a first one of said echoes and to pass a signal corresponding thereto, a second gate coupled to the receiver, said second gate being effective to open at a second time corresponding to the distance traveled by a second one of said echoes and pass a signal corresponding thereto, a signal comparator coupled to the gates and effective to compare the two signals passed thereby, said comparator being effective to produce a ratio signal that is a function of the ratio between said signals, and means responsive to the difference between the two distances and effective to divide the ratio signal as a function thereof to provide an attenuation signal.

5. An attenuation comparator for measuring the attenuation of a pulse of ultrasonic energy propagated between the front and rear faces of a workpiece, said comparator including the combination of:

a transducer for sensing echoes of ultrasonic energy reflected between the front and rear faces, a receiver coupled to the transducer and effective to produce a series of echo signals in response to said echoes, a first gate coupled to the receiver and effective to open at a first time corresponding to the occurrence of a particular echo and effective to pass a signal corresponding thereto, a second gate coupled to the receiver and effective to open at a second time corresponding to the occurrence of another particular echo and pass a second signal corresponding to the other echo, and a signal comparator coupled to the gates and effective to compare the two signals passed by the gates and produce a ratio signal.

6. An attenuation comparator including the combination of:

means for sensing the echoes produced by a pulse of ultrasonic energy reflected between front and rear faces of a workpiece, said means being effective to produce a series of echo signals corresponding to the ultrasonic echoes, a first gate coupled to said means and effective to pass a first echo signal, a second gate coupled to said means and effective to pass a second echo signal, and a comparator coupled to said gates and effective to compare the passed signals and produce an attenuation signal that is a function of the ratio between the passed signals.

7. An attenuation comparator for measuring the attenuation of a pulse of ultrasonic energy propagated between the front and rear faces of a workpiece, said comparator including the combination of:
  first means for sensing the echoes of ultrasonic energy reflected between the front and rear faces and producing echo signals in response to the echoes,
  second means coupled to the first means and effective to select two of said echo signals, compare their amplitudes and produce a ratio signal that is a function of the ratio between said echo signals,
  means responsive to the distance between the reflecting faces and effective to divide the ratio signal as a function of said distance to provide an attenuation signal, and
  indicator means coupled to the last means and effective to indicate the magnitude of the attenuation signal.

8. In a device of the class described the combination of:
  first means for receiving echoes of ultrasonic energy reflected between the front and rear faces of a workpiece and producing echo signals corresponding to the ultrasonic echoes,
  second means coupled to the first means and effective to pass two separate echo signals corresponding to particular echoes from the faces,
  third means coupled to the second means and responsive to said echo signals and effective to produce a ratio signal corresponding to the ratio between said echo signals, and
  means responsive to the distance between said faces and effective to modify said ratio signal as a function of said thickness to provide an attenuation signal.

9. In a device of the class described the combination of:
  first means for receiving echoes of ultrasonic energy reflected from within a workpiece and producing electrical echo signals corresponding to the ultrasonic echoes,
  second means coupled to the first means and effective to pass two separate electrical echo signals corresponding to two particular ultrasonic echoes from the workpiece,
  a signal comparator coupled to the last second means to produce an attenulation signal corresponding to the ratio between said pair of echo signals.

10. In a device of the class described the combination of:
  first means for receiving echoes of ultrasonic energy reflected from within a workpiece in response to a pulse of ultrasonic energy and producing electrical echo signals corresponding to the ultrasonic echoes, and
  second means coupled to the first means to select and compare a pair of separate echo signals and effective to produce a signal corresponding to the ratio between said echo signals.

11. An attenuation comparator for measuring the attenuation of ultrasonic energy in a workpiece having front and rear faces, said comparator including the combination of:
  means for transmitting a pulse of ultrasonic energy into the workpiece and producing a series of echo signals corresponding to the successive echoes of said energy within said workpiece,
  first sampling means coupled to the first means and effective to sample the echo signals during a particular sample interval to produce a first sample signal,
  second sampling means coupled to the first means and effective to sample the echo signals during a second particular sample interval to produce a second sample, and
  an indicator coupled to said sampling means to indicate the amount of attenuation of said sample signals.

References Cited

FOREIGN PATENTS 1,336,355    7/1963    France.

OTHER REFERENCES

McMasters, R. C.: Nondestructive Testing Handbook, vol. 2, sec. 45, pp. 3 and 4, 1959, The Ronald Press Co., N.Y.

RICHARD C. QUEISSER, *Primary Examiner.*

JOHN P. BEAUCHAMP, *Assistant Examiner.*